US010632704B2

(12) United States Patent
Kakitani et al.

(10) Patent No.: US 10,632,704 B2
(45) Date of Patent: Apr. 28, 2020

(54) MOLDED PRODUCT DISCHARGE DEVICE

(71) Applicant: KIKUSUI SEISAKUSHO LTD., Kyoto-shi (JP)

(72) Inventors: Tomohiro Kakitani, Kyoto (JP); Satoru Watano, Sakai (JP)

(73) Assignee: KIKUSUI SEISAKUSHO LTD., Kyoto-Shi, Kyoto (JP)

( * ) Notice: Subject to any disclaimer, the term of this patent is extended or adjusted under 35 U.S.C. 154(b) by 57 days.

(21) Appl. No.: 16/129,909

(22) Filed: Sep. 13, 2018

(65) Prior Publication Data

US 2019/0105864 A1 Apr. 11, 2019

(30) Foreign Application Priority Data

Oct. 6, 2017 (JP) ................................. 2017-196328
Jun. 12, 2018 (JP) ................................. 2018-111614

(51) Int. Cl.

*B29C 43/34* (2006.01)
*B30B 15/32* (2006.01)
*B30B 15/02* (2006.01)
*B30B 11/08* (2006.01)
*B30B 9/28* (2006.01)

(52) U.S. Cl.

CPC ................ *B30B 15/32* (2013.01); *B30B 9/28* (2013.01); *B30B 11/08* (2013.01); *B30B 15/022* (2013.01)

(58) Field of Classification Search

CPC ................................ B29C 43/08; B30B 15/32
See application file for complete search history.

(56) References Cited

U.S. PATENT DOCUMENTS 2,946,298 A * 7/1960 Doepel .................. B30B 11/34 425/345
6,827,567 B2 * 12/2004 Kouda .................... B30B 11/08 425/345
8,029,261 B2 * 10/2011 Narasaki .................. B30B 7/04 425/345
8,062,015 B2 * 11/2011 Sanderson ............. B30B 11/34 425/345

FOREIGN PATENT DOCUMENTS

JP 2011-156576 A 8/2011
SU 831629 A1 5/1981

* cited by examiner

*Primary Examiner* — Joseph S Del Sole
*Assistant Examiner* — Thu Khanh T Nguyen
(74) *Attorney, Agent, or Firm* — McGinn IP Law Group, PLLC.

(57) ABSTRACT

A molded product discharge device accompanies a compression-molding machine that molds a molded product. The molded product discharge device is configured to discharge the molded product from the compression-molding machine. The molded product discharge device includes a rotator configured to be horizontally rotatable, a retainer facing the rotator with a predetermined distance therebetween, a plurality of projections extending toward the retainer from a surface opposite to the retainer, in an outer circumferential portion of the rotator, aligned circumferentially around a rotary axis of the rotator at an interval larger than an external size of the molded product, and configured to capture the molded product, and a guide disposed adjacent to the outer circumferential portion of the rotator and closing a gap between the adjacent projections from outside.

20 Claims, 6 Drawing Sheets

MOLDED PRODUCT DISCHARGE DEVICE

BACKGROUND

There has been known a rotary compression-molding machine including a die table of a turret having die bores, an upper punch and a lower punch slidably retained above and below each of the die bores, and configured to horizontally rotate the die table and the punches together to compression mold (or make a tablet) a powdery material filled in the die bores when the paired upper and lower punches pass between an upper roll and a lower roll. The molding machine of this type is applied, for example, to produce pharmaceutical tablets, food products, electronic components, and the like.

The lower punches push products molded in the die bores upward to become as high as an upper surface of the die table. The molded products are then caught by a guide member positioned to confront the upper surface of the die table, are guided to a gutter chute slanted downward, and fall along the chute to often be collected in a container disposed vertically below the chute. Such a technique, however, fails to discharge the molded products in the order of molding by the compression-molding machine (i.e., in the order of alignment of the die bores). When the molded products drop from the upper surface of the die table onto the chute, the molded products may hit an inner wall of the chute or the container or may collide with each other to be damaged (e.g., broken, chipped, or abraded). In particular, molded products having less hardness such as orally disintegrating tablets (OD tablets that disintegrate by saliva or a small amount of water in an oral cavity) or chewable tablets (that are crunched in an oral cavity) are seriously damaged by dropping.

There has publicly been known a discharge device configured to discharge products molded by the molding machine one by one. The discharge device includes a rotator (i.e., transfer disc) configured to rotate in synchronization with the die table of the molding machine and having, at an outer circumferential edge, a plurality of pockets that is recessed inward. The pockets catch to discharge the molded products pushed out of the die bores in the die table, and cause the molded products to be transferred along a rotation locus of the pockets (see JP 2011-156576 A and the like).

The molded products captured in the pockets of the rotator receive centrifugal force. The pockets are opened outward, so that the molded products tend to come outward from the pockets in a transfer process. Accordingly, a guide is equipped adjacent to the outer circumferential edge of the rotator, has an arc shape in a planar view, and closes the pockets from outside, to prevent the molded products from being ejected from the pockets.

In a conventional molded product discharge device, pockets of a rotator are sized and shaped to match a size and a shape of molded products to be produced by a compression-molding machine. When the molded products are changed in size or shape, the same rotator is not applicable and thus needs to be replaced.

SUMMARY OF THE INVENTION

The exemplary invention provides a molded product discharge device configured to handle molded products having various sizes or shapes.

The exemplary invention provides a molded product discharge device accompanying a compression-molding machine that includes a die table having a vertically penetrating die bore, and an upper punch and a lower punch vertically slidably retained above and below the die bore, and is configured to compress a powdery material filled in the die bore with use of the upper punch and the lower punch to mold a molded product, the device configured to discharge the molded product from the compression-molding machine for transfer. The molded product discharge device includes a rotator configured to be horizontally rotatable, a retainer facing the rotator with a predetermined distance therebetween, a plurality of projections extending toward the retainer from a surface opposite to the retainer, in an outer circumferential portion of the rotator, aligned circumferentially around a rotary axis of the rotator at an interval larger than an external size of the molded product, and configured to capture the molded product, and a guide disposed adjacent to the outer circumferential portion of the rotator and closing a gap between the adjacent projections from outside.

A powdery material is an aggregate of minute solids and conceptually includes an aggregate of particles such as so-called granules and an aggregate of powder smaller than such particles.

The product molded by the compression-molding machine is captured by projections extending from the rotator. The molded product is then accommodated in the gap between the adjacent projections in a region between the rotator and the retainer facing each other, and is transferred along a rotation locus of the projections. The molded product discharge device that is configured, as set forth above, can discharge and transfer molded products varied in size or shape with use of the identical rotator.

In a case where the compression-molding machine is a rotary compression-molding machine configured to mold the molded product while horizontally rotating the die table, the upper punch, and the lower punch along with one another, preferably, the guide has a start edge disposed to overlap the die table from above and positioned vertically above a horizontal rotation locus of the die bore, and the guide catches the molded product pushed upward to an upper surface of the die table by the lower punch and guides the molded product to the gap between the projections. Therefore, the molded product discharge device can accommodate one by one, in the gaps in the order of molding, products sequentially molded by the compression-molding machine for transfer.

In order to prevent the molded product from being reversed or rolling during transfer, the rotator and the retainer have a clearance therebetween set to be substantially equal to or larger than a thickness of the molded product and smaller than an external size of the molded product.

If the molded product discharge device the device further includes a guide closing, from inside, the gap between the adjacent projections of the rotator, then the molded product is inhibited from being unintendedly displaced radially inward with respect to the rotator.

If at least one of the rotator or the retainer has a communicating bore causing the gap between the adjacent projections to be communicable with outside and configured to import an air flow blowing off dust entering the gap or dust adhering to the molded product captured in the gap, then the dust adhering to the molded product can be removed in the transfer process.

If the device further includes a camera positioned to confront a horizontal rotation locus of the projections and configured to image the molded product captured in the gap between the adjacent projections, then the molded product discharge device is configured to inspect an exterior of the molded product.

The exemplary invention may achieve a molded product discharge device configured to handle molded products having various sizes or shapes.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
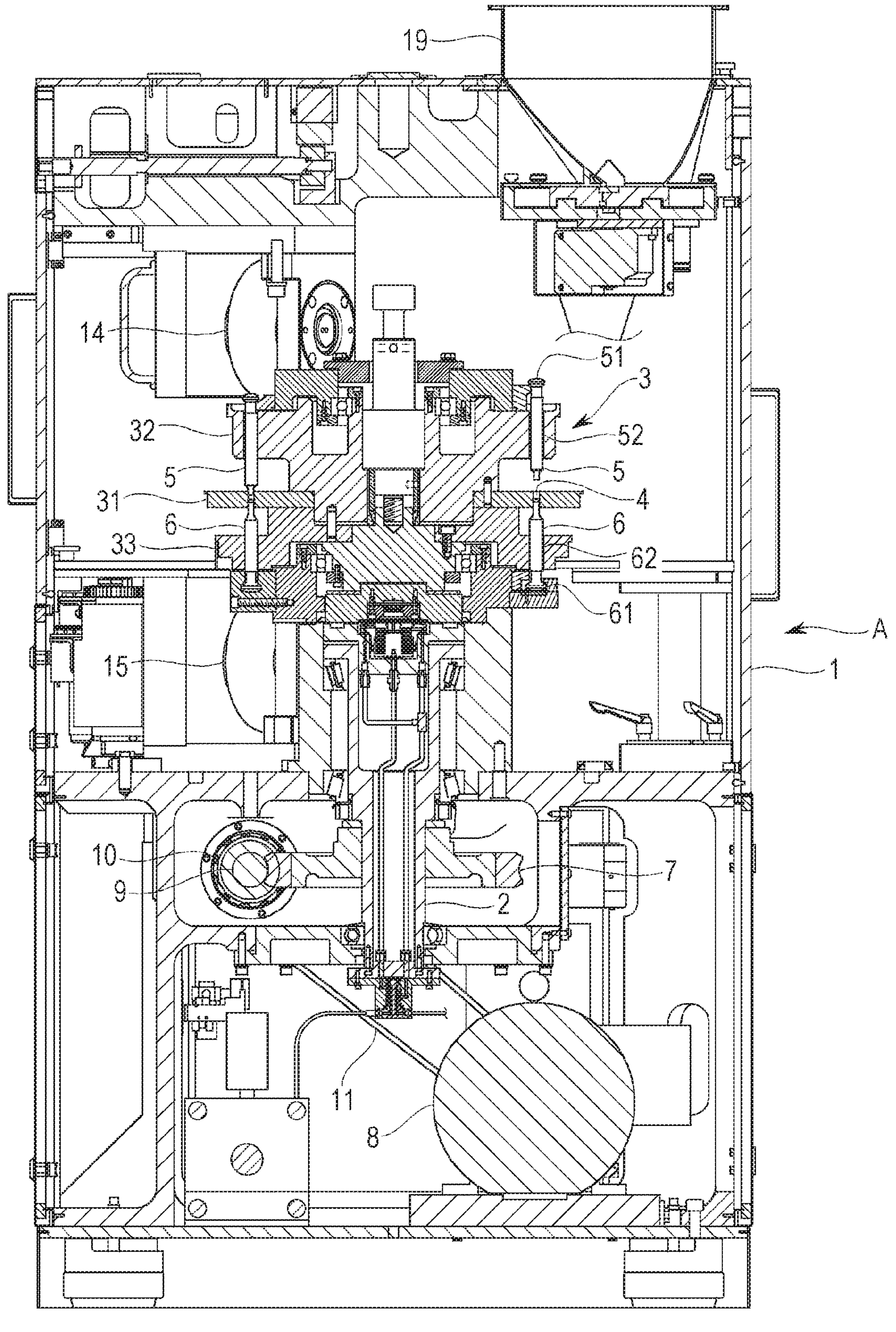
FIG. 1 is a side sectional view of a rotary compression-molding machine according to an exemplary embodiment of the exemplary invention.

An exemplary embodiment of the exemplary invention will now be described with reference to the drawings. Initially described is an overview of an entire rotary compression-molding machine (hereinafter, referred to as the "molding machine") A according to the exemplary embodiment. As shown exemplarily in FIG. 1, the molding machine A includes a frame 1 accommodating an upright shaft 2 functioning as a rotary shaft and a turret 3 attached to a connection portion that is disposed at a top of the upright shaft 2.

The turret 3 horizontally rotates about the upright shaft 2, and more specifically, spins. The turret 3 includes a die table (e.g., die disc) 31, an upper punch retaining portion 32, and a lower punch retaining portion 33. As shown exemplarily in FIG. 2, the die table 31 has a substantially circular disc shape in a planar view in a vertical direction, and has a plurality of die bores 4 that is disposed in an outer circumferential portion and is aligned in a rotation direction (e.g., a circumferential direction) at predetermined intervals. Each of the die bores 4 vertically penetrates the die table 31. The die table 31 is alternatively divided into a plurality of plates. Instead of the die bores 4 formed by directly drilling the die table 31, the die table 31 alternatively has a plurality of die members that is separate from the die table 31 and is detachably attached thereto. In this case, each of the die members has a die bore penetrating vertically.

The die bores 4 each have an upper punch 5 and a lower punch 6 disposed above and below the die bore 4, respectively. The upper punches 5 and the lower punches 6 are retained by the upper punch retaining portion 32 and the lower punch retaining portion 33, respectively, so as to be independently slidable vertically with respect to a corresponding one of the die bores 4. The upper punches 5 each have a tip 53 that enters and exits a corresponding one of the die bores 4. The lower punches 6 each have a tip 63 that is kept inserted in a corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 via a belt 11, so as to drive to rotate the upright shaft 2 by way of the worm gear 10 and the worm wheel 7, and further to rotate the turret 3 and the punches 5 and 6.

Figure 2:
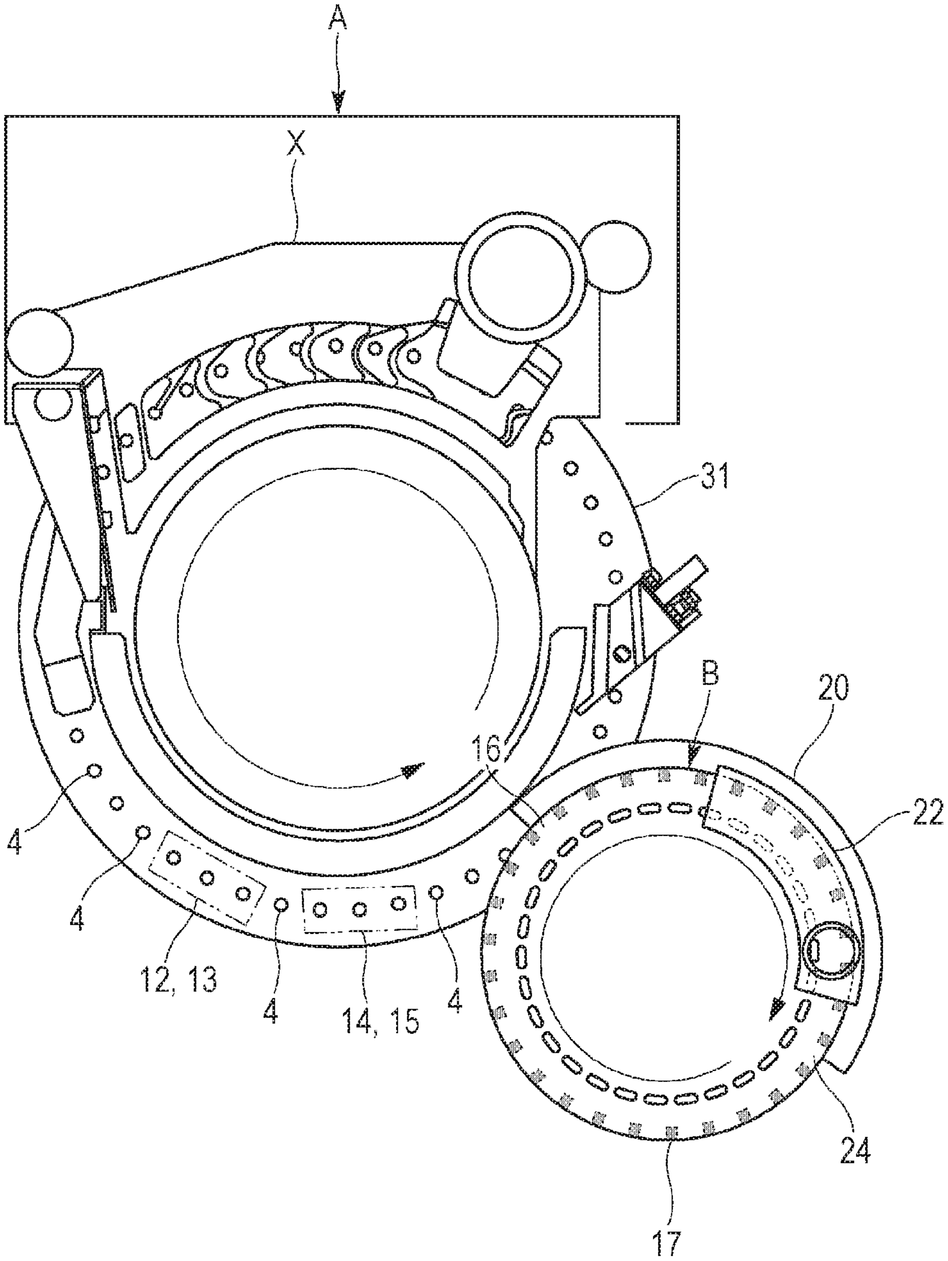
FIG. 2 is a plan view of a main part of the rotary compression-molding machine according to the exemplary embodiment.

A powdery material as a raw material for a compression-molded product P such as, for example, a pharmaceutical tablet is filled in the die bores 4 with use of a feeder X, as shown in FIG. 2. Examples of the feeder X include an agitated feeder and a gravity feeder, either one of which is applicable to the exemplary invention. The powdery material is fed to the feeder X by using a powdery-material feeding device. The powdery material is supplied to the powdery-material feeding device with use of a hopper 19. The hopper 19 is detachably attached to the molding machine A.

Figure 3:
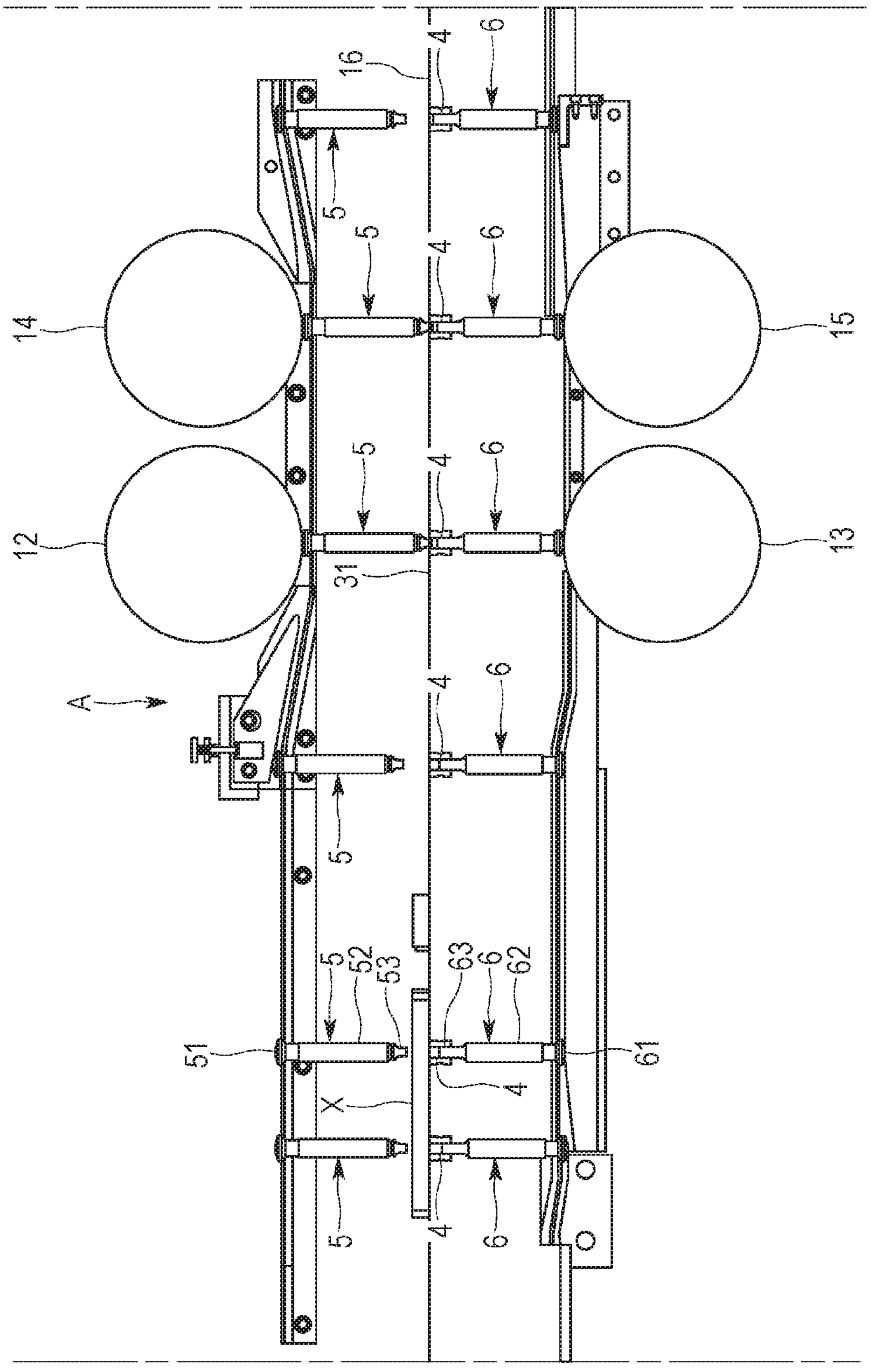
FIG. 3 is a cylindrical view of the rotary compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6, respectively.

The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that distal end surfaces of the tips 53 and 63 compress from above and below the powdery material filled in the die bores 4.

The upper and lower punches 5 and 6 have heads 51 and 61, respectively, pressed by the rolls 12, 13, 14, and 15, and trunks 52 and 62 smaller in diameter than the heads 51 and 61, respectively. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 as distal ends of the trunks 52 and 62 are thinner than the remaining parts and have diameters substantially equal to an inner diameter of the die bores 4 so as to be inserted to the die bores 4. The punches 5 and 6 revolve to cause the rolls 12, 13, 14, and 15 to come closer to the heads 51 and 61 of the punches 5 and 6, respectively. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a molded product discharge position 16 displaced ahead, in a rotation direction of the turret 3 and the punches 5 and 6, from a portion pressed by the substantial compression upper roll 14 and the substantial compression lower roll 15. Each of the lower punches 6 ascends until an upper end surface of the tip 63 of the lower punch 6 becomes substantially flush with an upper end of the die bore 4, or an upper surface of the die table 31 before reaching the molded product discharge position 16, and pushes the molded product P out of the die bore 4. The molded product P pushed out of the die bore 4 is collected at the molded product discharge position 16 by a molded product discharge device (hereinafter, referred to as the "discharge device") B according to the exemplary embodiment.

Figure 4:
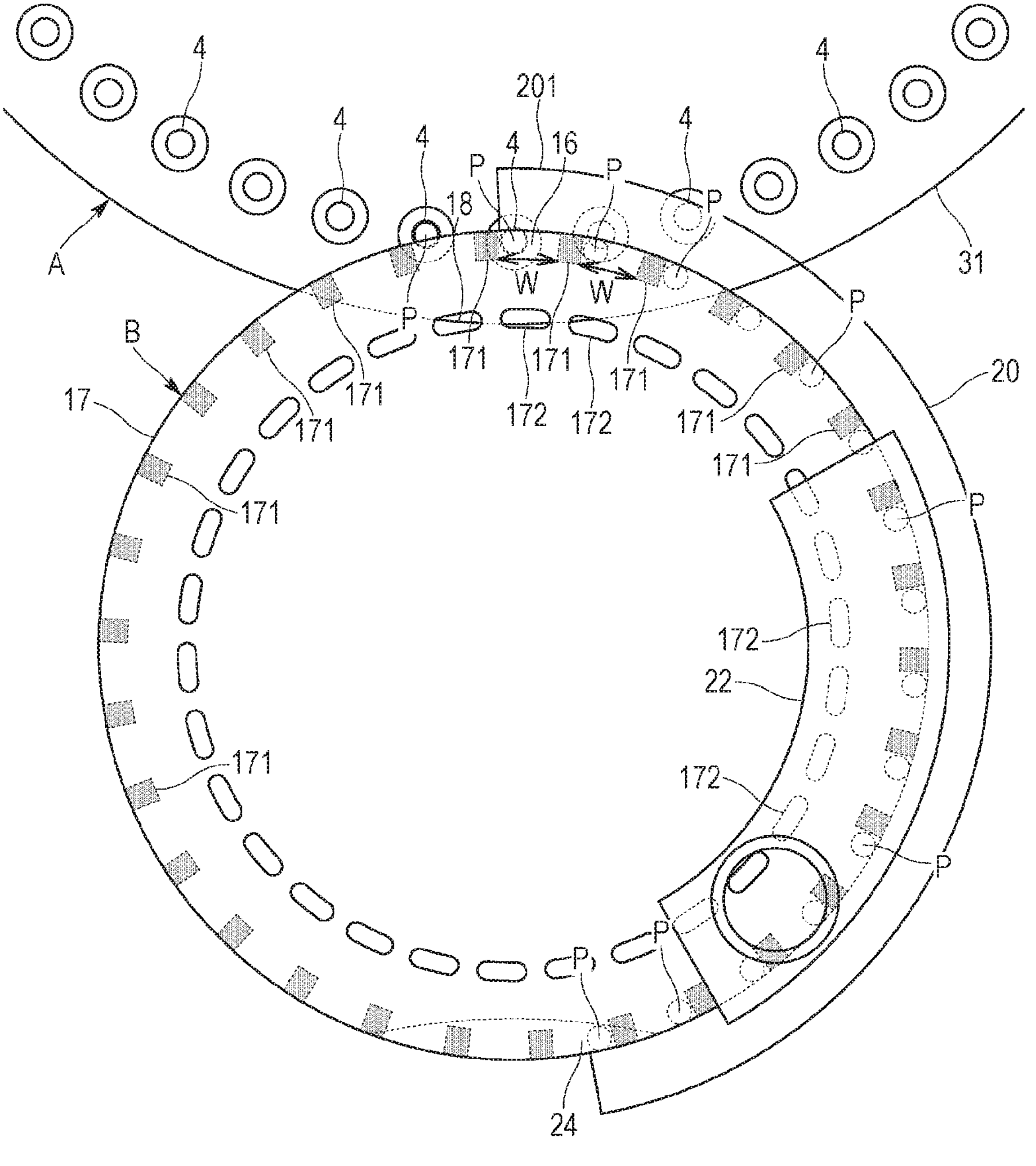
FIG. 4 is a plan view of a molded product discharge device according to the exemplary embodiment.
Figure 5:
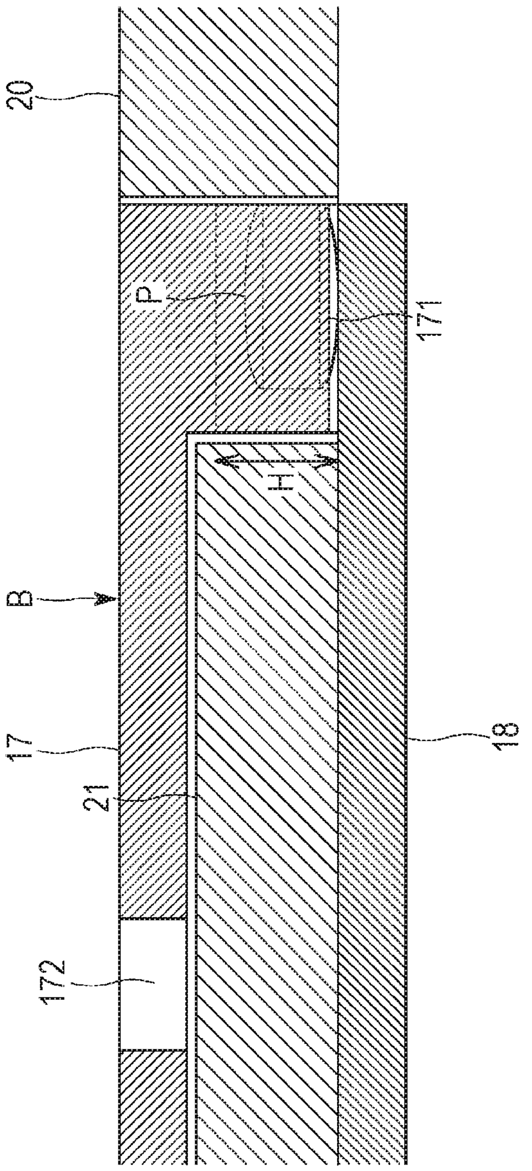
FIG. 5 is a longitudinal sectional view showing a main part of the molded product discharge device according to the exemplary embodiment.

The discharge device B accompanying the molding machine A will be described in detail hereinafter. As shown exemplarily in FIGS. 4 to 6, the discharge device B is configured to discharge, at the molded product discharge position 16, the molded product P by the molding machine A and convey the molded product P toward a device or an equipment configured apply a subsequent process to the molded product P, or a container or the like collecting the molded product P. The discharge device B includes, as main constituent elements, a rotator 17 configured to horizontally rotate in synchronization with the die table 31 of the molding machine A, a retainer 18 disposed vertically below the rotator 17 and facing the rotator 17, a plurality of projections 171 extending downward toward the retainer 18 from a lower surface facing the retainer 18, in an outer circumferential portion of the rotator 17, an outer guide 20 disposed adjacent to the outer circumferential portion of the rotator 17 and closing, from outside, gaps between the adjacent projections 171, and an inner guide 21 disposed inside the outer circumferential portion of the rotator 17 and closing, from inside, the gaps between the adjacent projections 171.

The rotator 17 has a substantially circular disc shape in a planar view in a vertical direction. The plurality of projections 171 at the rotator 17 is disposed along an outer circumferential edge of the rotator 17 circumferentially around a rotary axis of the rotator 17, to be spaced apart from each other at predetermined intervals. These projections 171 obviously rotate integrally with the rotator 17. The molded product P by the molding machine A is captured between adjacent projections 171 of the rotator 17 to be transferred while being accommodated in the gap between the adjacent projections 171.

The gaps between the projections 171 circumferentially adjacent to each other have a width W larger than the largest external size of the molded product P by the molding machine A. The largest external size corresponds to the longest one of line segments in a planar view, each extending from a certain point on an outer edge (i.e., an outline) of the molded product P to a different point on the outer edge of the molded product P through a gravity center or a geometrical center of the molded product P. In a case where the molded product P has an elliptical shape in a planar view, the largest external size corresponds to a major axis or a long diameter.

The rotator 17 has a lower surface facing an upper surface of the retainer 18 with a predetermined vertical distance therebetween. The lower surface of the rotator 17 is positioned higher than the upper surface of the die table 31 of the molding machine A. The outer circumferential portion of the rotator 17 partially overlaps the die table 31 of the molding machine A from above. The projections 171 extending from the lower surface of the rotator 17 each have a distal end adjacent to the upper surface of the retainer 18 and the upper surface of the die table 31. Synchronous rotation of the die table 31 and the rotator 17 temporarily overlaps each of the die bores 4 and the gap between the adjacent projections 171 at the molded-product discharge position 16.

Unlike the rotator 17, the retainer 18 does not rotate and is disposed to overlap the outer circumferential portion of the rotator 17 from below. The retainer 18 is disposed adjacent to the die table 31 of the molding machine A and has the upper surface substantially flush with the upper surface of the die table 31. The molded product captured in the gap between the adjacent projections 171 of the rotator 17 slides or rolls on the upper surface of the retainer 18 while being horizontally rotating along with the projections 171. In other words, the retainer 18 supports the transferred molded product from below. In order to prevent interference with the die table 31, the retainer 18 has a part that corresponds to the molded product discharge position 16 where the die table 31 and the rotator 17 overlap each other in a planar view and is cut away in an arc shape along an outer circumferential edge of the die table 31. The part of the retainer 18 has an edge immediately adjacent to the outer circumferential edge of the die table 31 and allows the molded product P to smoothly shift from the upper surface of the die table 31 of the molding machine A to the upper surface of the retainer 18 of the discharge device B.

The lower surface of the rotator 17 and the upper surface of the retainer 18 have a clearance H therebetween, which is substantially equal to or larger than a vertical thickness of the molded product P by the molding machine A and is smaller than the smallest external size of the molded product P. The smallest external size corresponds to the shortest one of line segments in a planar view, each extending from a certain point on the outer edge of the molded product P to a different point on the outer edge of the molded product P through the gravity center or the geometrical center of the molded product P. In the case where the molded product P has an elliptical shape in a planar view, the smallest external size corresponds to a minor axis or a short diameter. The thickness of the molded product P is substantially equal to a vertical distance between the tip 53 of the upper punch 5 and the tip 63 of the lower punch 6 upon completion of compressing the powdery material filled in the die bore 4 in the molding machine A.

The outer guide 20 is disposed adjacent to the outer circumferential edge of the rotator 17 and expands to have a substantially arc shape surrounding the rotator 17 in a planar view. The guide 20 closes, from outside, the gaps positioned between the adjacent projections 171 and opened radially outward on the rotator 17, to inhibit the molded products from coming outward from the gaps due to centrifugal force. The outer guide 20 has a start edge 201 projecting toward the die table 31 of the molding machine A and overlapping the die table 31 from above to be positioned vertically above a horizontal rotation locus of the die bores 4. The outer guide 20 serves as a guide member configured to catch the molded products P pushed to the upper surface of the die table 31 of the molding machine A.

The inner guide 21 is disposed adjacent to radially inner edges of the projections 171 of the rotator 17, and expands to have, in a planar view, a substantially arc shape located inside the outer circumferential portion of the rotator 17. The guide 21 closes, from inside, the gaps opened radially inward on the rotator 17, to inhibit an unintended inward displacement of the molded products. The inner guide 21 is fixed to the retainer 18 or may be formed integrally with the retainer 18. The rotator 17 has a part facing an upper surface of the inner guide 21 and having a lower surface slightly recessed upward from lower surfaces facing the gaps (i.e., portions not having the projections 171) in the outer circumferential portion of the rotator 17. The upper surface of the inner guide 21 excluding an area equipped with a dust collector 22, to be described later, is positioned slightly higher than the lower surfaces facing the gaps in the outer circumferential portion of the rotator 17. This prevents the molded products P from entering a space between the lower surface of the rotator 17 and the upper surface of the inner guide 21.

As described earlier, each of the lower punches 6 of the molding machine A ascends before reaching the molded product discharge position 16, to push the molded product P out of the die bore 4. The molded product P having been pushed out comes into contact with the outer guide 20 at the molded product discharge position 16 due to a rotation of the die table 31, and travels along the outer guide 20. The molded product P on the die table 31 then shifts onto the retainer 18. The molded product P is captured by the projections 171 extending downward from the rotator 17 and enters the gap between the adjacent projections 171 in a region between the rotator 17 and the retainer 18. The molded products P are each accommodated in one of the gaps. Thus, the gaps accommodate the molded products P one by one in the order of alignment of the die bores 4 in the die table 31 of the molding machine A (i.e., keeping the order of compression molding by the molding machine A).

Each of the molded products P captured in the gap between the adjacent projections 171 comes into contact with the projection 171 positioned behind in a rotation direction of the rotator 17 and is pushed by the projection 171 to slide or roll to be transferred on the retainer 18 along a rotation locus of the projection 171. Each of the molded products P accommodated in the gap is substantially constantly positioned relatively to the adjacent projections 171. The molded product P is displaced in the gap radially outward from a radially inner position on the rotator 17 because the rotating rotator 17 applies centrifugal force to the molded product P. The molded product P, however, comes into contact with an inner rim of the outer guide 20 to be prevented from being further displaced, so that the molded product P will not come outward from the gap. The rotator 17 closes the gaps from above, so that the molded product P captured in the gap will not suddenly bounce and come out of the gap.

The rotator 17 has communicating bores 172 each causing a corresponding one of the gaps between the adjacent projections 171 to be communicable with outside. The communicating bores 172 are positioned radially inside the gaps of the rotator 17 and vertically penetrate the rotator 17 as long bores extending circumferentially in the rotator 17. The communicating bores 172 are equal in the number to the gaps.

The dust collector 22 is equipped partially on the outer circumferential portion of the rotator 17. The dust collector 22 covers, from above, the communicating bores 172, the gaps between the adjacent projections 171, and a boundary between the rotator 17 and the outer guide 20. As shown exemplarily in FIG. 6, the dust collector 22 includes a spray nozzle 221 positioned vertically above the communicating bore 172 and configured to spray compressed air downward toward the communicating bore 172, and a dust collecting duct 222 positioned vertically above the boundary between the rotator 17 and the outer guide 20 and configured to suck air upward. The compressed air can be preliminarily ionized by a static eliminator, and can be sprayed in a pulsed manner.

The compressed air fed from the spray nozzle 221 reaches the gap between the adjacent projections 171 through the space between the lower surface of the rotator 17 and the upper surface of the inner guide 21, and is sprayed to a surface of the molded product P accommodated in the gap to blow and to remove dust adhering to the surface of the molded product P. The molded products P are accommodated in the gaps between the adjacent projections 171 one by one in the discharge device B according to the exemplary embodiment. The compressed air can reliably hit each of the molded products P through the communicating bore 172 provided for each of the gaps to effectively remove dust adhering to the molded product P. Air hitting the molded product P leaks upward through a space between the rotator 17 and the outer guide 20 and is sucked into the dust-collecting duct 222.

Figure 6:
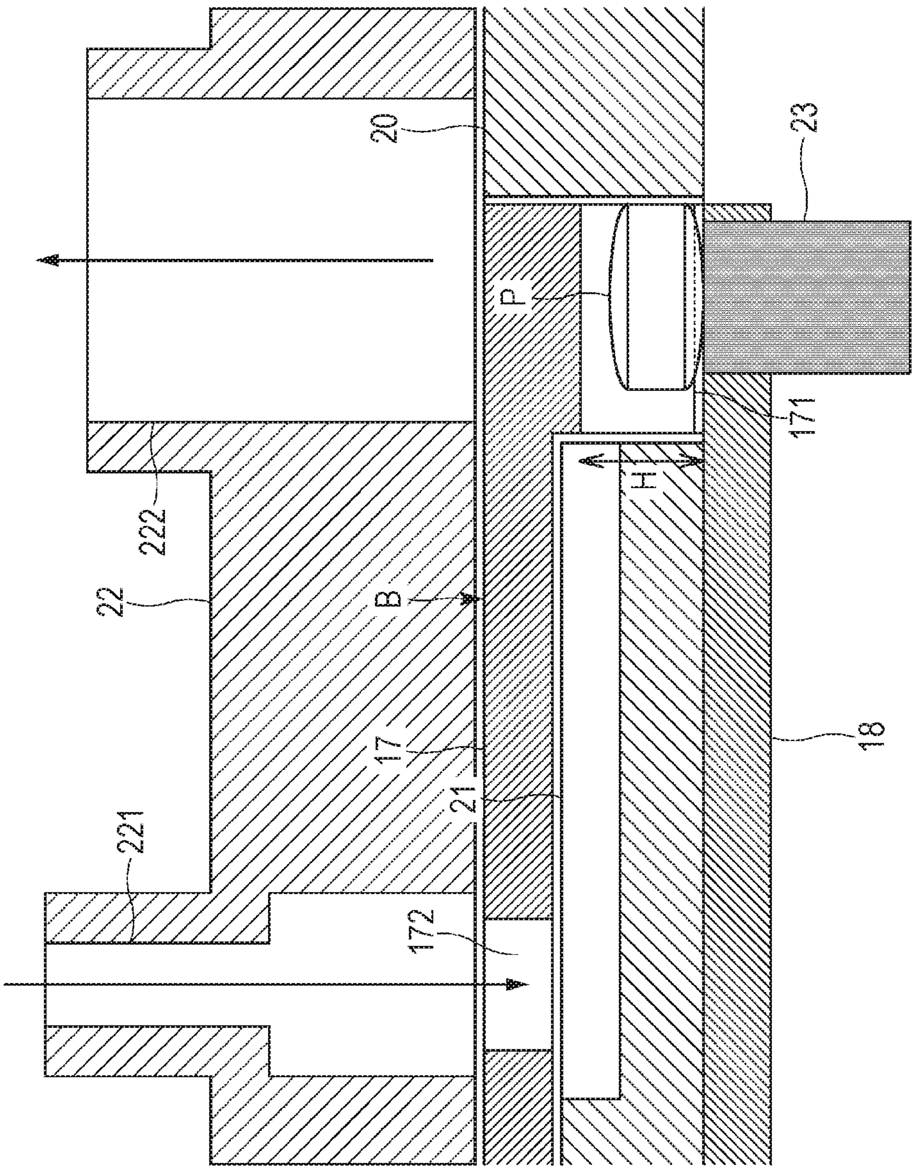
FIG. 6 is a longitudinal sectional view showing another main part of the molded product discharge device according to the exemplary embodiment.

As shown exemplarily in FIG. 6, the outer circumferential portion of the rotator 17 can optionally be equipped with a camera 23 in a predetermined area. The camera 23 images a predetermined surface like a lower surface of each of the molded products P captured in the gap between the adjacent projections 171 and transferred, to obtain a picture thereof. The obtained picture can be used for inspection of an exterior of the molded product P.

The molded product P captured between the adjacent projections 171 of the rotator 17 is transferred to a transfer end position 24. The retainer 18 has a cut-away portion positionally corresponding to the end position 24. The outer circumferential portion of the rotator 17 and the retainer 18 do not overlap each other at the end position 24. The molded products P reaching the end position 24 are not supported by the retainer 18 from below and drop out of the gaps between the adjacent projections 171 to be delivered to a device or equipment configured to apply a subsequent process to the molded products P or a container or the like collecting the molded products P while keeping the order of alignment.

The exemplary embodiment provides a discharge device B accompanying a molding machine A that includes a die table 31 having a vertically penetrating die bore 4, and an upper punch 5 and a lower punch 6 vertically slidably retained above and below the die bore 4, and is configured to compress a powdery material filled in the die bore 4 with use of the upper punch 5 and the lower punch 6 to mold a molded product P. The device B is configured to discharge the molded product P from the molding machine A for transfer. The device B includes a rotator 17 configured to be horizontally rotatable, a retainer 18 facing the rotator 17 with a predetermined distance therebetween, a plurality of projections 171 extending toward the retainer 18 from a surface opposite to the retainer 18, in an outer circumferential portion of the rotator 17, aligned circumferentially around a rotary axis of the rotator 17 at an interval W larger than an external size of the molded product, and configured to capture the molded product, and a guide 20 disposed adjacent to the outer circumferential portion of the rotator 17 and closing a gap between the adjacent projections 171 from outside.

The molded product P by the molding machine A is captured by the projections 171 extending from the rotator 17. The molded product P is then accommodated in the gap between the adjacent projections 171 in the region between the rotator 17 and retainer 18 facing each other, and is transferred along the rotation locus of the projections 171. The discharge device according to the exemplary embodiment can discharge and transfer the molded products P varied in size or shape with use of the identical rotator 17.

The molding machine A includes a rotary-molding machine configured to mold the molded product while horizontally rotating the die table 31, the upper punch 5, and the lower punch 6 along with one another, and the outer guide 20 has a start edge disposed to overlap the die table 31 from above and positioned vertically above a horizontal rotation locus of the die bore 4, and the guide catches the molded product P pushed upward to an upper surface of the die table 31 by the lower punch 6 and guides the molded product P to the gap between the projections 171. The products P sequentially molded by the molding machine A can thus be accommodated in the gaps one by one to be transferred in the order of molding.

The rotator 17 and the retainer 18 have a clearance H therebetween set to be substantially equal to or larger than a thickness of the molded product P and smaller than the external size of the molded product P. The molded product P can thus be prevented from being reversed or rolling over during transfer.

Furthermore, the discharge device further includes a guide 21 closing, from inside, the gap between the adjacent projections 171 of the rotator 17. The molded product P is thus inhibited from being unintendedly displaced radially inward with respect to the rotator 17.

The rotator 17 has a communicating bore 172 causing the gap between the adjacent projections 171 to be communicable with outside and configured to import an air flow blowing off dust entering the gap or dust adhering to the molded product P captured in the gap. Dust adhering to the molded product P can thus be removed in the transfer process.

The discharge device further includes a camera 23 positioned to confront a horizontal rotation locus of the projections 171 and configured to image the molded product P captured in the gap between the adjacent projections 171. The discharge device B thus enables an inspection of the exterior of the molded product P.

In a case where the discharge device is configured to cause the molded products P by the molding machine A to drop onto a slanted gutter chute to collect the molded products P in a container or the like, the molded products P cannot be kept in the order or in a vertical orientation and a large number of molded products P will inevitably be mixed. The discharge device B according to the exemplary embodiment is configured to discharge the plurality of molded products P from the molding machine A one by one in the order of the aligned die bores 4 in the molding machine A, or in the order of molding of the molded products P, and accommodate the molded products P in the gaps while keeping the order of alignment. The discharge device B is configured to transfer the molded products P from the molded product discharge position 16 to the end position 24 while the molded products P are kept in the order of production by the molding machine A. Furthermore, the molded products P will not be reversed vertically in the transfer process.

The discharge device B is configured to horizontally convey the molded products P kept substantially flush with the upper surface of the die table 31 of the molding machine A. A chute causes the molded products P to fall therealong. The molded products P thus need to be raised in height to be delivered to a device or an equipment configured to apply a subsequent process to the molded products P. The discharge device B according to the exemplary embodiment does not require such a process. The discharge device B further eliminates a risk of damage to the falling molded product P due to collision with an inner wall of the chute, the container, or the like, or the molded products P already reserved in the container or the like.

The gaps between the adjacent projections 171 are large in size for accommodation of the molded products P, and thus will require no strict positional accuracy upon delivery from the die table of the molding machine A to the rotator 17 of the discharge device B. The molded products P can be discharged and transferred appropriately even without significantly high positional accuracy of the discharge device B to be installed to the molding machine A.

In a case where the molding machine A has a change in the number of the die bores 4 and the pairs of upper and lower punches 5 and 6 of the turret 3, the discharge device B is applicable by replacement of the rotator 17 (with another rotator having the projections 171 and the gaps corresponding in the number to the die bores 4 and the punches 5 and 6) and/or adjustment of a relative rotational speed of the rotator 17 of the discharge device B to the turret 3 of the molding machine A.

In order to synchronize rotation between the turret 3 of the molding machine A and the rotator 17 of the discharge device B, the discharge device B can include a servo motor or a stepping motor as a motor configured to rotate the rotator 17, and a rotary encoder or the like configured to detect a rotational speed of the turret 3, to achieve feedback control of the rotational speed of the motor configured to rotate the rotator 17 for synchronization of rotation of the turret 3 with rotation of the rotator 17. The turret 3 and the rotator 17 are alternatively mechanically connected to interlock via a gear transmission mechanism, a winding transmission mechanism, or the like. The discharge device B according to the exemplary embodiment is thus applicable to molding machines A varied in type, specification, and dimension.

Each of the molded products P accommodated in the gap between the adjacent projections 171 is conveyed while being pushed by the projection 171 positioned behind in the rotation direction of the rotator 17. The molded product P in the gap thus has a constant relative position to the projections 171 or the gap. This is effectual for processing of spraying compressed air to the molded product accommodated in a specific one of the gaps to remove or extract the molded product.

The discharge device B according to the exemplary embodiment does not need a process of aligning the molded products P in a device or equipment configured execute a subsequent process. There is needed no mechanism for aligning the molded products P, so that a reduction in size of the entire device is achieved due to unnecessity for the mechanism.

A so-called containment machine has difficulty in extracting to observe the molded product P as needed. The discharge device B disposed in the containment machine enables imaging with use of the camera 23 disposed at a predetermined position on a convey route without discharging the molded product P out of the system. The exterior of the molded product can thus be inspected without stopping production of the molded products P by the molding machine A and transfer of the molded products P by the discharge device B. The containment machine also achieves observation of the molded product in a production process (while production is continued without stopping tableting) by installing an exterior inspection mechanism.

The molded products P kept in the order of alignment by being captured respectively in the gaps in the transfer process are each associated with the die bore 4 and the pair of the punches 5 and 6 used for molding the molded product P. It is thus possible to quickly specify the die bore 4 or the punch 5 or 6 in trouble upon detection, through the exterior inspection of the molded product P, tableting failure such as sticking of the powdery material to the die bore 4 or the punch 5 or 6 to cause a chipped molded product or mold trouble such as chipping of the tip 53 or 63 of the punch 5 or 6. Only such a defective molded product P can be discarded with no necessity for wasting normal molded products P to achieve improvement in yield.

The molded products P are not reversed vertically in the transfer process, and thus require neither determination nor alignment of a vertical orientation of each of the molded products P prior to import to a subsequent device or equipment such as a printer configured to print on the molded products P. Furthermore, in a case where the subsequent device or equipment is configured to suck the molded products P for conveyance, the molded products P aligned in the vertical orientation can be sucked easily. The molded products P may have a large parting line or engraving on one of the surfaces and be difficult to be sucked on the surface. The molded products P will be difficult to be sucked if the conveyed molded products P are not aligned in the vertical orientation. The discharge device B according to the exemplary embodiment does not have such difficulty.

The discharge device B is further configured to suck dust during conveyance, so that each of the molded products P can reliably receive a sucking air flow for effective removal of dust.

The exemplary invention is not limited to the exemplary embodiment detailed above. The rotator 17 according to the exemplary embodiment has the communicating bores 172 causing the gaps between the adjacent projections 171 to be communicable with outside. The retainer 18 can have dust removal communicating bores causing the gaps between the adjacent projections 171 to be communicable with outside.

The rotator 17 can be configured to suck each of the molded products P accommodated in the gap between the adjacent projections 171, to achieve a reduction in distance or time of sliding or rolling of the molded product P on the retainer 18 in the transfer process. This inhibits abrasion of the molded products P. In a case where the powdery material for the molded products P includes hard particles, the molded products P slide on the retainer 18 to possibly abrade the retainer 18 and generate dust that may stain the molded products P. The molded products P sucked to the rotator 17 will have no risk of such stain.

The outer circumferential portion of the rotator 17 partially overlaps the die table 31 of the molding machine A from above, but does not necessarily overlap from above or below or be in contact therewith.

The discharge device B includes the rotator 17 for transfer of the molded products P along the horizontal rotation locus. The molded products P can alternatively be transferred along a linear locus by a conveyor belt or the like.

Moreover, the specific configuration of each portion can be modified in various manners within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A molded product discharge device accompanying a compression-molding machine that includes a die table including a vertically penetrating die bore, and an upper punch and a lower punch vertically slidably retained above and below the die bore, respectively, and is configured to compress a powdery material filled in the die bore by the upper punch and the lower punch to mold a molded product, the molded product discharge device being configured to discharge the molded product from the compression-molding machine, the molded product discharge device comprising:

a rotator configured to be horizontally rotatable;

a retainer facing the rotator with a predetermined distance therebetween;

a plurality of projections extending toward the retainer from a surface opposite to the retainer, in an outer circumferential portion of the rotator, aligned circumferentially around a rotary axis of the rotator at an interval larger than an external size of the molded product, and configured to capture the molded product; and a guide disposed adjacent to the outer circumferential portion of the rotator and closing a gap between adjacent projections from outside.

2. The molded product discharge device according to claim 1, wherein the compression-molding machine includes a rotary compression-molding machine configured to mold the molded product while horizontally rotating the die table, the upper punch, and the lower punch along with one another, and wherein the guide includes a start edge disposed to overlap the die table from above and positioned vertically above a horizontal rotation locus of the die bore, and the guide catches the molded product pushed upward to an upper surface of the die table by the lower punch and guides the molded product to the gap between the projections.

3. The molded product discharge device according to claim 1, wherein the rotator and the retainer have a clearance therebetween substantially equal to or larger than a thickness of the molded product and smaller than the external size of the molded product.

4. The molded product discharge device according to claim 1, further comprising a guide closing, from inside, the gap between the adjacent projections of the rotator.

5. The molded product discharge device according to claim 1, wherein at least one of the rotator or the retainer includes a communicating bore causing the gap between the adjacent projections to be communicable with outside and configured to import an air flow blowing off dust entering the gap or dust adhering to the molded product captured in the gap.

6. The molded product discharge device according to claim 1, further comprising a camera positioned to confront a horizontal rotation locus of the projections and configured to image the molded product captured in the gap between the adjacent projections.

7. The molded product discharge device according to claim 2, wherein the rotator and the retainer have a clearance therebetween substantially equal to or larger than a thickness of the molded product and smaller than the external size of the molded product.

8. The molded product discharge device according to claim 2, further comprising a guide closing, from inside, the gap between the adjacent projections of the rotator.

9. The molded product discharge device according to claim 2, wherein at least one of the rotator or the retainer includes a communicating bore causing the gap between the adjacent projections to be communicable with outside and configured to import an air flow blowing off dust entering the gap or dust adhering to the molded product captured in the gap.

10. The molded product discharge device according to claim 2, further comprising a camera positioned to confront a horizontal rotation locus of the projections and configured to image the molded product captured in the gap between the adjacent projections.

11. The molded product discharge device according to claim 3, further comprising a guide closing, from inside, the gap between the adjacent projections of the rotator.

12. The molded product discharge device according to claim 3 wherein at least one of the rotator or the retainer includes a communicating bore causing the gap between the adjacent projections to be communicable with outside and configured to import an air flow blowing off dust entering the gap or dust adhering to the molded product captured in the gap.

13. The molded product discharge device according to claim 3, further comprising a camera positioned to confront a horizontal rotation locus of the projections and configured to image the molded product captured in the gap between the adjacent projections.

14. The molded product discharge device according to claim 4, wherein at least one of the rotator or the retainer includes a communicating bore causing the gap between the adjacent projections to be communicable with outside and configured to import an air flow blowing off dust entering the gap or dust adhering to the molded product captured in the gap.

15. The molded product discharge device according to claim 4, further comprising a camera positioned to confront a horizontal rotation locus of the projections and configured to image the molded product captured in the gap between the adjacent projections.

16. The molded product discharge device according to claim 5, further comprising a camera positioned to confront a horizontal rotation locus of the projections and configured to image the molded product captured in the gap between the adjacent projections.

17. A molded product production system, comprising:

a compression-molding machine that includes a die table including a vertically penetrating die bore, and an upper punch and a lower punch vertically slidably retained above and below the die bore, respectively, and is configured to compress a powdery material filled in the die bore to mold a molded product; and a molded product discharge device configured to discharge the molded product from the compression-molding machine, the molded product discharge device comprising:

a rotator configured to be horizontally rotatable;

a retainer facing the rotator with a predetermined distance therebetween;

a plurality of projections extending toward the retainer from a surface opposite to the retainer, in an outer circumferential portion of the rotator, aligned circumferentially around a rotary axis of the rotator at an interval larger than an external size of the molded product, and configured to capture the molded product; and a guide disposed adjacent to the outer circumferential portion of the rotator and closing a gap between adjacent projections from outside.

18. The molded product production system according to claim 17, wherein the compression-molding machine includes a rotary compression-molding machine configured to mold the molded product while horizontally rotating the die table, the upper punch, and the lower punch along with one another.

19. The molded product production system according to claim 18, wherein the guide includes a start edge disposed to overlap the die table from above and positioned vertically above a horizontal rotation locus of the die bore, and the guide catches the molded product pushed upward to an upper surface of the die table by the lower punch and guides the molded product to the gap between the projections.

20. The molded product production system according to claim 17, wherein the rotator and the retainer have a clearance therebetween substantially equal to or larger than a thickness of the molded product and smaller than the external size of the molded product.

* * * * *